US008508366B2

(12) United States Patent
Petricoin, Jr.

(10) Patent No.: US 8,508,366 B2
(45) Date of Patent: Aug. 13, 2013

(54) SCANNING SECURITY DETECTOR

(75) Inventor: Dennis M. Petricoin, Jr., Hemlock, NY (US)

(73) Assignee: Robert Bosch GmbH, Stuttgart (DE)

( * ) Notice: Subject to any disclaimer, the term of this patent is extended or adjusted under 35 U.S.C. 154(b) by 656 days.

(21) Appl. No.: 12/119,146

(22) Filed: May 12, 2008

(65) Prior Publication Data

US 2009/0278684 A1    Nov. 12, 2009

(51) Int. Cl.
*G08B 13/18*    (2006.01)

(52) U.S. Cl.
USPC .......................... 340/555; 340/541; 340/557

(58) Field of Classification Search
USPC ................................................ 340/555–557
See application file for complete search history.

(56) References Cited

U.S. PATENT DOCUMENTS

| | | | | |
|---|---|---|---|---|
| 2,468,042 A * | 4/1949 | Cranberg | ...................... | 356/3.05 |
| 2,774,961 A * | 12/1956 | Orlando | ........................ | 340/555 |
| 3,476,947 A * | 11/1969 | Burney | ........................ | 340/555 |
| 3,597,755 A * | 8/1971 | Parkin | .......................... | 340/555 |
| 3,644,917 A * | 2/1972 | Perlman | ........................ | 340/556 |
| 4,052,616 A * | 10/1977 | Keller | .......................... | 250/353 |
| 4,324,977 A * | 4/1982 | Brauer | ....................... | 250/222.2 |
| 4,656,462 A * | 4/1987 | Araki et al. | ................... | 340/556 |
| 4,736,097 A * | 4/1988 | Philipp | ........................ | 250/221 |
| 4,760,381 A * | 7/1988 | Haag | ............................. | 340/556 |
| 4,893,005 A | 1/1990 | Stiebel | | |
| 4,903,009 A * | 2/1990 | D'Ambrosia et al. | ........ | 340/556 |
| 4,952,911 A | 8/1990 | D'Ambrosia et al. | | |
| 5,180,910 A * | 1/1993 | Spratte et al. | ................. | 250/221 |
| 5,283,640 A * | 2/1994 | Tilton | ............................. | 348/42 |
| 5,305,390 A * | 4/1994 | Frey et al. | ...................... | 382/115 |
| 5,378,892 A * | 1/1995 | Levy et al. | ..................... | 250/352 |
| 5,546,189 A * | 8/1996 | Svetkoff et al. | ............... | 356/602 |
| 5,574,426 A * | 11/1996 | Shisgal et al. | ................ | 340/435 |
| 5,956,424 A | 9/1999 | Wootton et al. | | |
| 6,160,479 A * | 12/2000 | Åhlen et al. | ................... | 340/555 |
| 6,317,043 B1 * | 11/2001 | Berk | .............................. | 340/555 |
| 6,362,468 B1 * | 3/2002 | Murakami et al. | ............ | 250/221 |
| 6,900,729 B2 * | 5/2005 | Paximadis et al. | ............ | 340/565 |
| 6,985,212 B2 * | 1/2006 | Jamieson et al. | ............ | 356/5.01 |
| 7,026,600 B2 | 4/2006 | Jamieson et al. | | |
| 7,429,996 B2 | 9/2008 | Bradski | | |
| 2007/0064976 A1 | 3/2007 | England, III | | |

OTHER PUBLICATIONS

Sahba, A Proposed Motionless Laser Scanning Architecture for Perimeter Security, 2006, IEEE, pp. 9-15.*

* cited by examiner

*Primary Examiner* — Jennifer Mehmood
*Assistant Examiner* — Brian Wilson
(74) *Attorney, Agent, or Firm* — Michael Best & Friedrich LLP

(57) ABSTRACT

A method of identifying a potential security threat in a space. A first scan of the space is performed during a first time interval by illuminating at least a portion of the space with energy from an energy source at an illumination angle, such that the energy is reflected from a surface in the space. An incident angle of the reflected energy is detected with a detector located at a known distance from the energy source and a distance from the surface to the energy source is calculated based on the incident angle. The steps are repeated for a plurality of different locations in the space. A first map of the space is generated from the first scan, and a second map is generated from a second scan of the area. The maps are compared to determine a change in the space and to determine if a potential security threat is present.

11 Claims, 6 Drawing Sheets

US 8,508,366 B2

SCANNING SECURITY DETECTOR

BACKGROUND

1. Field of Invention

The present invention relates to security systems, in particular to a scanning security system that captures volumetric images of a space over time and analyzes the images to identify potential security threats.

2. Related Art

Many security systems employ devices such as motion sensors and light beams as simple and inexpensive mechanisms to determine whether there is a potential security threat in a space. However, these relatively unsophisticated systems are not effective at distinguishing false positives (i.e. small animals, waving plants or balloons) from true security threats. In addition, these systems can sometimes be defeated by avoidance of the sensor beams or by covering the detectors.

SUMMARY OF THE INVENTION

In one aspect, the invention is a method of identifying a potential security threat in a space, including collecting a first scan of the space during a first time interval. Collecting a first scan includes (i) illuminating at least a portion of the space with energy from an energy source at an illumination angle, such that the energy is reflected from a surface in the space; (ii) detecting an incident angle of the reflected energy with a detector disposed at a known distance from the energy source; (iii) calculating a distance from the surface to the energy source based on the incident angle; (iv) repeating steps (i)-(iii) for a plurality of different locations in the space; and (v) generating a first map of the space for the first time interval. The method includes collecting a second scan of the space at a second time interval, comprising repeating steps (i)-(v) above during the second time interval to generate a second map of the space; comparing the first map to the second map to determine a change in the space; and determining if a potential security threat is present based on the change in the space.

In another aspect, the invention is a method of distinguishing false positives from threats in a space, including collecting a first scan of the space during a first time interval. Collecting a first scan includes (i) illuminating at least a portion of the space with an energy from an energy source such that the energy is reflected from a surface in the space; (ii) detecting the incident angle of the reflected energy with a detector disposed at a known distance from the energy source; (iii) calculating a distance from the surface to the energy source using triangulation; (iv) repeating steps (i)-(iii) for a plurality of portions of the space; and (v) generating a first map of the space for the first time interval. The method further includes collecting a second scan of the space during a second time interval, comprising repeating steps (i)-(v) above during the second time interval to generate a second map of the space and comparing the first map to the second map to determine a change in the space. The method also includes identifying a potential security threat based on the change in the space and determining if the potential security threat is a false positive based on at least one of a rate of movement, a height, and a location of the threat within the space.

In still another aspect, the invention is a scanning security system, the security system including a transmitter, a detector, and a computing system. The transmitter includes an energy source and a scanning assembly. The detector is configured to detect a direction of energy impinging thereon. The computing system includes a processor and a storage medium. The computing system is configured to collect a first scan of a space during a first time interval. Collecting a first scan includes (i) illuminating at least a portion of the space with energy from the energy source at an illumination angle, such that the energy is reflected from a surface in the space; (ii) detecting an incident angle of the reflected energy with the detector disposed at a known distance from the energy source; (iii) calculating a distance from the surface to the energy source based on the incident angle; (iv) repeating steps (i)-(iii) for a plurality of different locations in the space; and (v) generating a first map of the space for the first time interval. The computing system is further configured to collect a second scan of the space at a second time interval, wherein collecting a second scan includes repeating steps (i)-(v) above during the second time interval to generate a second map of the space. The computing system is also configured to compare the first map to the second map to determine a change in the space and determine if a potential security threat is present based on the change in the space.

BRIEF DESCRIPTION OF THE DRAWINGS

Other objects and advantages of the invention will become apparent upon reading the following detailed description and upon reference to the accompanying drawings in which.

DETAILED DESCRIPTION OF THE INVENTION

Before any constructions of the invention are explained in detail, it is to be understood that the invention is not limited in its application to the details of construction and the arrangement of components set forth in the following description or illustrated in the following drawings. The invention is capable of other constructions and of being practiced or of being carried out in various ways. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items.

Figure 1:
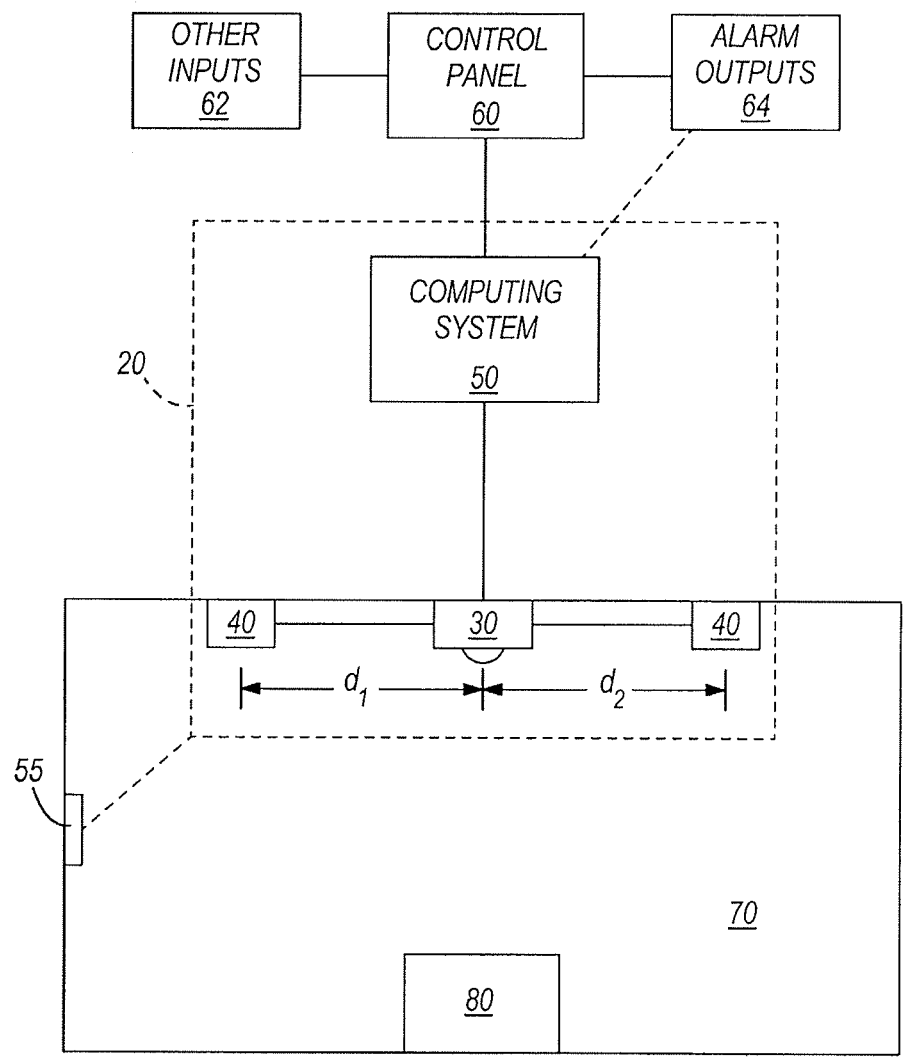
FIG. 1 is a schematic diagram of a scanning security system.

A security system 20 according to one construction of the invention is shown in FIG. 1. The system 20 includes a transmitter 30, one or more detectors 40, and a computer or computing system 50. The detectors 40 are separated from each other and spaced distances d1 and d2 from the transmitter. The detectors are electrically connected to the transmitter 30 and the transmitter 30 is electrically connected to the computing system 50. Thus, information from the detectors 40 is communicated to the computing system 50. In one construction, the system 20 communicates with a control panel 60. The control panel 60 receives security threat information from the system 20 and may also receive information from other input sources 62, including other security devices (e.g., door sensors, motion sensors, beam sensors), safety-related devices (e.g. smoke detectors, fire alarms, etc.), or various environmental sensors (e.g. temperature, water, or light sensors). The control panel 60 in turn may be coupled to various alarm-type outputs 64 such as lights, audible alarms (e.g. a mechanical bell or siren, or an electronic alarm), or a signal to a remote location such as a police station, a private security firm, or an individual (a homeowner) can be directly notified electronically (e.g. through a pager, cell phone, or other portable electronic device, an automatically-generated email, or other electronic means). Alternatively, the system 20 may be directly coupled to the alarm-type outputs 64 without an intervening control panel 60 (FIG. 1).

Figure 2:
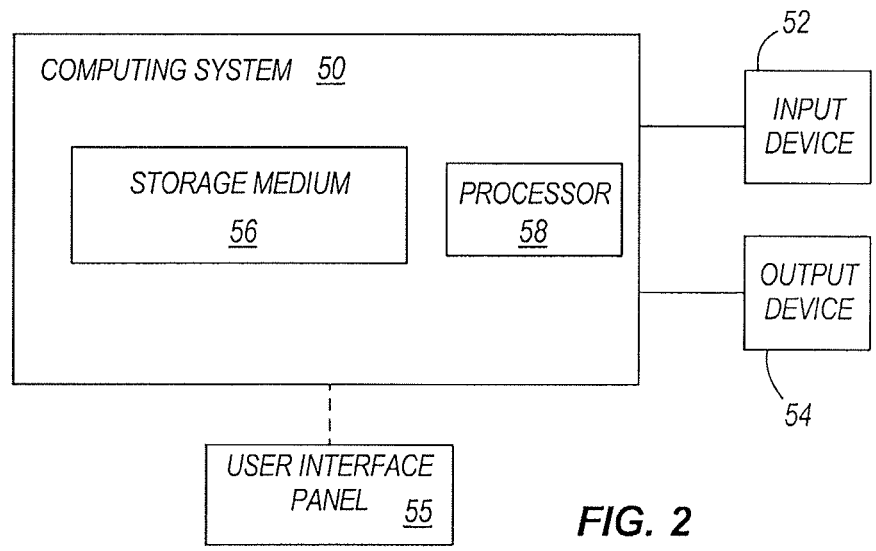
FIG. 2 is a schematic diagram of a computing system as is used with the scanning security system.

The computing system 50 may be integrated into the transmitter 30 or may be a separate component. The computing system 50 includes an input device 52, an output device 54, a storage medium 56, and a processor 58 (FIG. 2). Possible input devices 52 include a keyboard, a computer mouse, a touch screen, and the like. Output devices 54 include a cathode-ray tube (CRT) computer monitor, a liquid-crystal display (LCD) computer monitor, a light-emitting diode (LED) display, and the like. Storage media 56 include various types of memory such as a hard disk, RAM, flash memory, and other magnetic, optical, physical, or electronic memory devices. The processor 58 is a computer processor suitable for performing calculations and directing other functions for performing input, output, calculation, and display of data in the disclosed calculator.

Input and output functions may be included on a separate device that is remote from the rest of the system 20, instead of or in addition to any other input device 52 or output device 54. For example, a user interface panel 55 may be mounted on a wall in the space 70 along with the other components of the system 20, or alternatively the user interface panel 55 may be mounted in a remote location so that the system 20 can be armed or disarmed without entering or leaving the space 70 (FIG. 2). In another construction, the user interface panel 55 is a portable remote control. In each case, the user interface panel 55 may be hard-wired to the system 20 or may communicate with the system via a wireless connection, for example using radio frequency, infrared, ultrasonic, or other methods of wireless communication. The appropriate receiver for the wireless communications may be located either as a standalone component or may be incorporated into a component of the system 20, such as the computing system 50, the transmitter 30, or the detectors 40.

The computing system 50 may be a stand-alone component or may be integrated into the transmitter 30. If the computing system 50 is a separate component from the transmitter 30, the transmitter 30 and computing system 50 may be wired together or may communicate wirelessly (e.g. using radio-frequency, infrared, or other wireless signals). Similarly, the detector(s) 40 may communicate with the computing system 50 and/or the transmitter 30 via wired or wireless connections. Each of the components of the system 20 may be powered by a battery (disposable or rechargeable) or other portable power supply, or an A/C power source. In one construction, power can be provided by both the A/C source as well as a battery, such that the system 20 operates from A/C power at times but can also be operated solely on battery power for periods of time, e.g., in event of a power failure. The computing system 50 also encompasses elements that may be incorporated into other elements of the system 20, for example logic and memory elements may be incorporated into the transmitter 30, the detectors 40, or the user interface panel 55.

Figure 3:
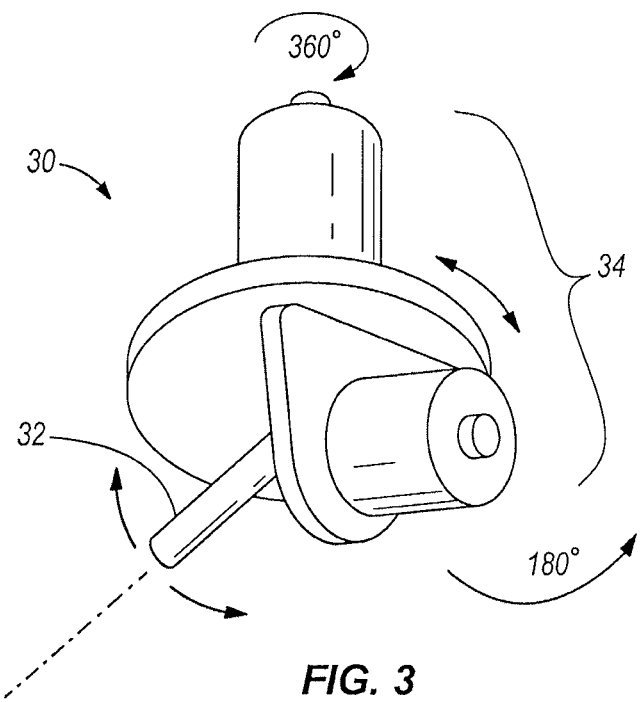
FIG. 3 shows a movable energy transmitter for use with the scanning security system.

The transmitter 30 is a device that can deliver a focused beam of energy to points in the space 70. The energy should be capable of being reflected from the objects 80 of interest in the space 70. The transmitter 30 comprises an energy source 32 and a scanning assembly 34 (FIG. 3). Possible types of energy include light, including ultraviolet, infrared, and visible light; ultrasonic; and microwave. The energy may be focused into a beam using optical (in the case of light), electronic, or other appropriate focusing elements. Alternatively, the energy source 32 may be a laser (e.g. a infrared laser) or other focused energy source. The energy may be emitted continuously or may be intermittent. To produce an intermittent beam of energy, the energy source 32 may be switched on and off, or a shutter device may be placed in the path of the beam. In one construction a pulsed laser is used as the energy source 32 to produce an intermittent energy beam.

In some constructions, the energy source 32 emits energy having an identifiable signature, so that reflected energy collected by the detectors 40 can be distinguished from background emissions, and also so that an intruder cannot defeat the system by deliberately increasing the background levels of the energy, e.g. by shining an infrared source in the space 70. In one construction, the signature comprises a modulated or pulsed laser signature of a particular frequency (e.g., 30 kHz) and wavelength (e.g., an infrared wavelength) that is distinct from background energy levels. In such constructions, appropriate detectors 40 are provided which not only are suitable for the particular type of energy that is emitted by the energy source 32, but which are capable of identifying the signature (e.g., the detectors 40 may include a lock-in amplifier set for the appropriate frequency).

The scanning assembly 34 moves the energy source 32 in a controlled manner so that the energy beam can be scanned throughout the space 70. In one construction, the scanning assembly 34 comprises a rotating base on which the energy source 32 is pivotably mounted (FIG. 3). The rotation of the base and the pivoting of the energy source 32 relative to the base may be controlled by stepper motors, so that the energy source 32 can be rotated 360° and pivoted 180° in precise increments, allowing the energy source 32 to be aimed any point in the space 70 that is at or below the height of the transmitter 30. In some constructions, the actual position of the energy source 32 is determined (e.g., using optical encoders) and this position is transmitted to the computing system 50 to be used in calculating positions of objects. In other constructions, the positions of the energy source 32 are calculated based on movement instructions sent by the computing system 50 to the scanning assembly 34, i.e., to the stepper motors or other positioning devices of the scanning assembly 34.

Suitable detectors 40 are chosen that are capable of recognizing the energy that is emitted from the transmitter 30 against whatever background levels of energy are present in the space 70. The detectors 40 may comprise one or more photomultipliers, photodiodes, CCDs, optical elements, or other suitable device for detecting the particular energy that is emitted by the transmitter 30. The detectors 40 may also include energy- and wavelength-selective filters so that only the energy that is emitted by the transmitter 30 is permitted to reach the detectors 40. The detectors 40 convert the detected energy to an electronic signal that is transmitted to the computing system 50. The detectors 40 also transmit information to the computing system 50, information which indicates the angle at which the detected energy impinged on the detector 40.

Figure 4A:
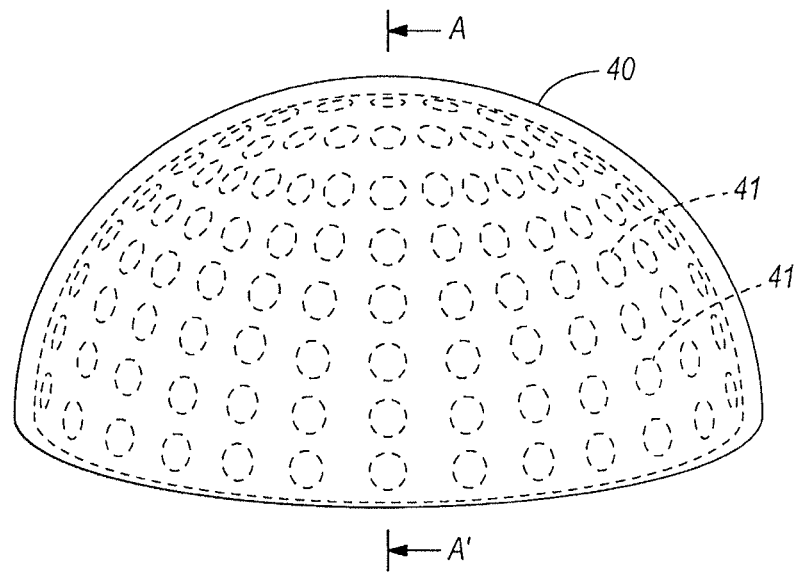
FIG. 4A shows a detector for use with the scanning security system.
Figure 4B:
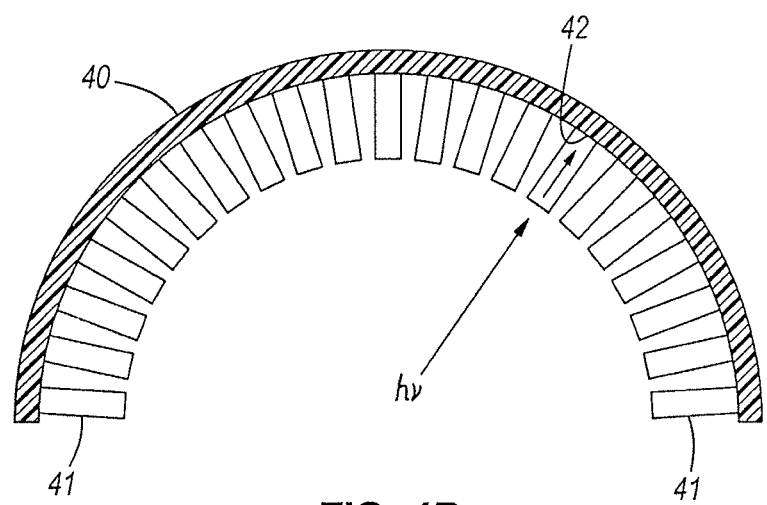
FIG. 4B shows a cross-section along A-A' of the detector of FIG. 4A.

In one construction, the detector 40 comprises a hemispherically-arranged collection of tubes 41, each having an individual energy detection element 42 at the bottom thereof (FIGS. 4A, 4B). In one construction the tubes 41 are attached to a hemispherical element made of metal, plastic, or other suitable material. The hemispherical element may be a flat surface (e.g. half of a hollow sphere) or it may be a mesh, grid, lattice, or other discontinuous structure. The tubes 41 are preferably opaque throughout and non-reflective on the insides thereof. At least one end of each tube 41 permits energy to pass therethrough (e.g. the tube 41 is open or has an appropriate filter, glass, or optical element on the end to permit energy to pass into the tube). The detection elements 42 are inside the tubes 41, for example at the bottoms thereof. Given that the detection elements 42 are at the bottoms of relatively narrow, opaque, and non-reflective tubes 41, only the energy that is reflected from a particular direction (generally the energy that is on a course that is parallel to the sides of the tube 41) reaches the detection element 42. Thus, knowledge of the position of the tube 41 and detection element 42 that received the reflected energy (or the highest level of reflected energy) indicates the angle at which the reflected energy impinged on the detector 40. The impingement angles corresponding to each tube 41 can be determined at the time of manufacture and/or based on a calibration procedure performed on the system 20 after installation.

Figure 5A:
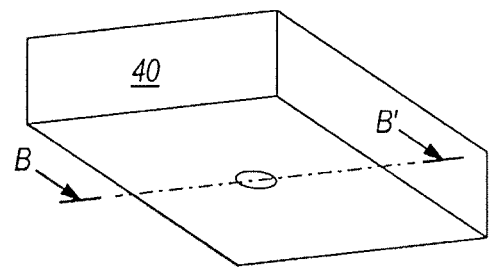
FIG. 5A shows another detector for use with the scanning security system.
Figure 5B:
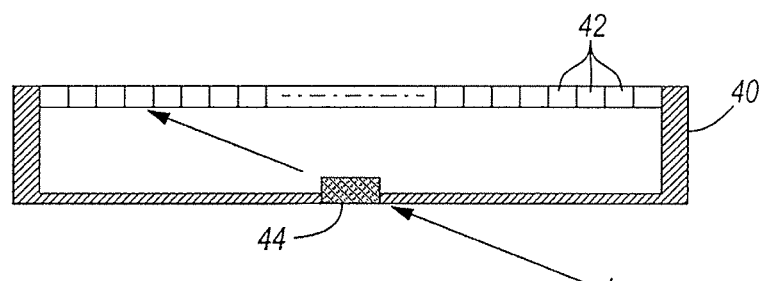
FIG. 5B shows a cross-section along B-B' of the detector of FIG. 5A.
Figure 5C:
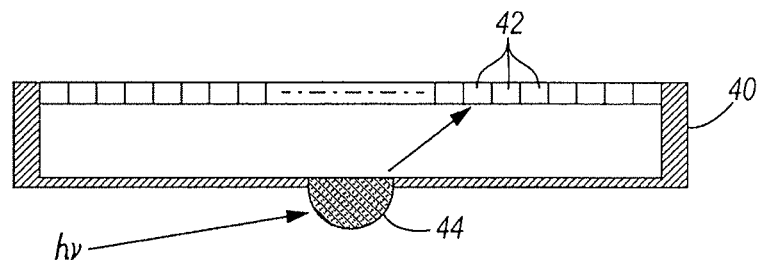
FIG. 5C shows a cross-section along B-B' of an alternative construction of the detector of FIG. 5A.

In another construction, the detector 40 comprises a plurality of individual detection elements 42 arranged in a linear or two-dimensional array, where the reflected energy goes through a pinhole, lens, or prism 44 before impinging on one or more of the individual detection elements 42 (FIGS. 5A, 5B, 5C). The pinhole, lens, or prism 44 allows energy to penetrate the detector housing while the remainder of the housing blocks the energy, thus focusing the energy on one or a small number of detection elements 42. If element 44 is a lens or prism, the incoming energy may be gathered from a relatively wide area and focus it into a smaller cone that can be projected onto the array of detection elements 42. For example, if a fisheye lens is employed for element 44, light may be collected from a complete hemispherical region (FIG. 5C). Similarly, if a prism is employed for element 44, incident energy is directed to a particular detection element 42 based on the angle of incidence and the structure of the prism 44. The angle at which the reflected energy has impinged on the detector 40 is determined using information regarding the position of the array of detection elements 42 as well as information regarding which of the detection element(s) 42 received the reflected energy (or the highest level of reflected energy). For any of the variations on the system 20 described herein, initial calibration of the spatial relationship between the position of the transmitter 30 and the response of the detectors 40 can be performed under controlled conditions.

In one construction, the detectors 40 are fixedly mounted, e.g., to the ceiling of a room. In this case, the detectors 40 are capable of receiving reflected energy from any location within the space 70. In another construction, the detectors 40 have a more limited zone of reception, but the array of detection elements 42 is aimed in the same direction as the transmitter 30. In the latter case, subsequent calculation of the incident angle of reflected energy takes into account the direction of the array of detection elements 42.

The information regarding the direction at which the energy impinges on the detector 40 can include the angle of the incoming energy relative to the horizontal as well as the direction of the incoming energy with respect to a vertical axis.

Figure 6:
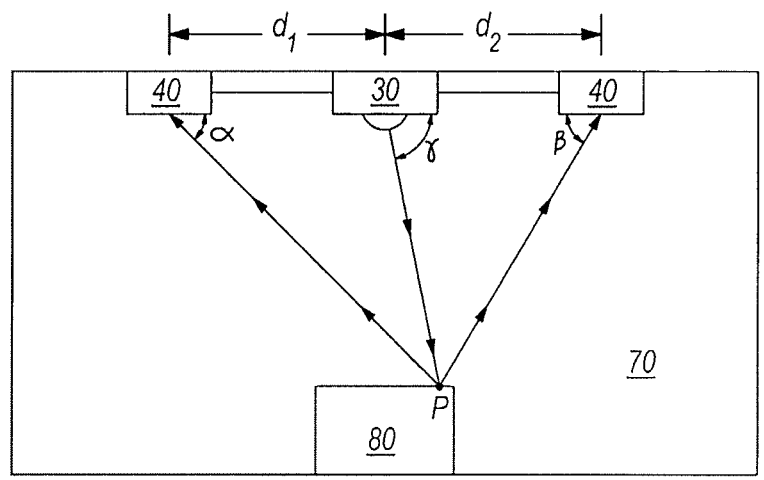
FIG. 6 is a diagram of energy transmission, reflection, and detection for a scanning security system.

The detectors 40 are located at a known distance apart and in the vicinity of the transmitter 30. Although the exemplary system 20 presented in the text and figures depicts two detectors 40, the system 20 can also work with one, three, or more detectors. In a construction of the system 20 having a single detector, the angle $\gamma$ at which the transmitter 30 emits energy is used along with the angle $\beta$ at which the detector 40 receives the reflected energy and the distance $d_2$ between the transmitter 30 and the detector 40 to calculate the three-dimensional location of point P on the object 80 (FIG. 6). When two or more detectors 40 are used, the distance $d_1 + d_2$ between the detectors 40 may be used, along with the angles $\alpha$ and $\beta$ of the incident energy impinging on the detectors 40 (FIG. 6). When the third dimension is considered, an additional angle of incident energy is factored in for each detector 40 and the three-dimensional location of reflective point P is determined using known triangulation methods. The location of point P can be expressed in three-dimensional (x, y, z) coordinates, polar coordinates (r, $\theta$), or other appropriate coordinate system. The point of reference for any of the coordinate systems can be made relative to any convenient point, for example the location of the transmitter 30 or in a remote corner of the space 70.

For reference, the distance of the transmitter 30 and detectors 40 from the bottom of the space 70 can be recorded. In one construction, the space 70 is a room and the transmitter 30 and detectors 40 are at the same distance from the bottom of the space 70, corresponding approximately to the distance from the floor to the ceiling of the room, less the thickness of the transmitter 30 and detectors 40. This distance can be entered by having a user simply measure the distance and record it manually using a user interface. Alternatively, the system 20 can calculate the distance to the bottom of the space 70 (e.g., the floor of a room), provided that the user indicates which location to use. For example, the user may remove all objects from directly under the transmitter 30, instruct the system 20 to calibrate the distance to the floor, and appropriate readings would be taken to determine the distance of the space immediately below the transmitter 30, which would be stored and thereafter used as the floor-to-ceiling height. Other reference points could also be calculated and other methods of calibration could be used as well.

Using the measurement of the distance from the bottom of the space 70, the system 20 can then determine the height of an object in the space 70. Information regarding the height may then be used as part of an analysis to distinguish false positive readings from actual security threats. For example, if a moving object is detected and the object is less than two feet tall, then the object might be dismissed as a false positive if it is known that there are small pets (e.g., dogs or cats) in the space 70.

If a single detector 40 is employed, the distance between the detector 40 and the transmitter 30 is recorded in the system 20. In constructions of the system 20 employing two or more detectors 40, the distances between each detector 40 and the transmitter 30 are recorded in the system 20. Thus, if a signal is received from only one detector 40 (e.g., if a detector is broken, loses its connection, or is obstructed) the system 20 can still perform triangulation calculations based on the data from the single detector 40, the angle at which the beam of energy is emitted from the transmitter 30, and the distance between the transmitter 30 and the detector 40 (FIG. 6).

The distances between the one or more detectors 40 and the transmitter 30 can be entered into the system 20 in several ways. In one construction, the detectors 40 and the transmitter 30 are fixedly mounted to one another at known distances at the time of manufacture, or these preset distances are determined by factory-made connecting elements. The preset distances are programmed into the computing system 50, also at the time of manufacture, so that the computing system 50 uses these values when performing triangulation calculations. In another construction, the distances between the one or more detectors 40 and the transmitter 30 are measured after the system 20 is installed and these measurements are entered into the computing system 50. The distances between the transmitter 30 and the detectors 40 can be set to optimize coverage of the space 70 as well as accuracy of the scanning. Locations of the transmitter 30 and/or the detectors 40, and distances therebetween, can also be reset after the initial installation to account for changes in the space 70, including changes in the locations of objects 80.

Figure 7:
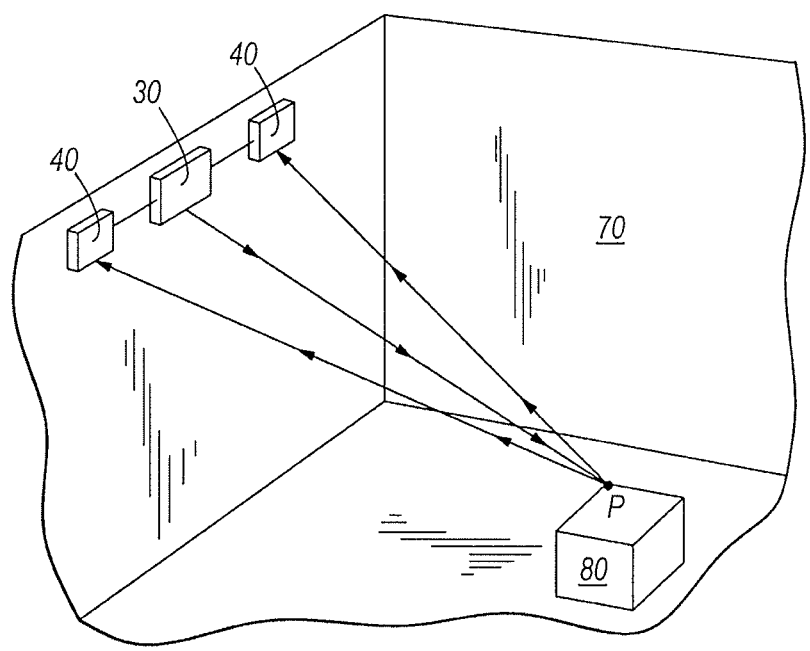
FIG. 7 is a diagram of energy transmission, reflection, and detection for an alternative construction of a scanning security system.

The transmitter 30 and detectors 40 can be mounted horizontally within the space 70, e.g., on a ceiling in a room (FIGS. 1, 6). Alternatively, the transmitter 30 and detectors 40 may be mounted vertically, e.g., on a wall, in either case typically in an elevated position relative to the objects 80 within the space 70 to allow the energy beam to probe the space 70 and to have sufficient open area to be reflected back to the detectors 40 reliably (FIG. 7). In some constructions, multiple transmitters 30 and detectors 40 are mounted in a space 70. For example, multiple transmitters and detectors are used if the space 70 is large or has large objects 80 that obstruct parts of the space 70, or if the space 70 has a complex shape that cannot be probed by a single transmitter 30.

Using the above-described components, the system 20 generates three-dimensional maps of a space 70 (e.g., an interior room or an outdoor space) which may include one or more objects 80 therein (FIG. 1). The maps are generated by the processor 58 of the computing system 50 and stored in the storage medium 56, and may also be transmitted to the output device 54 for viewing or other use. The system 20 generates multiple maps over time and compares the information contained in the maps between time points to determine if there are security threats.

To generate a single three-dimensional map of the space 70, the system 20 collects three-dimensional position data from a series of points throughout the space 70. To collect a single position location, the transmitter 30 transmits a beam of energy into the space 70 and the detectors 40 detect the energy that is reflected back (FIG. 6). In one construction, the energy source 32 is moved incrementally and its motion may be paused briefly while the detectors 40 collect energy that is reflected from the space 70, including from objects 80 within the space 70. The detectors 40 sense the incident angle of the reflected energy, and information regarding the angle and/or intensity of detected energy is transmitted to the computing system 50.

In some cases, more than one detection element 42 of a particular detector 40 records a reflected energy signal, in which case the computing system 50 may simply record the angle corresponding to the detection element 42 having the highest level of signal. Alternatively, the system 50 may interpolate an incident angle corresponding to a location between several different detection elements 42 that detected a significant level of energy. Based on the distance between the detectors 40 and the angles at which the reflected energy reached each detector 40, the computing system 50 uses triangulation methods to calculate the location in three-dimensional space from which the energy was reflected. Alternatively, the triangulation calculations may be based on the incident angle data from one detector 40 along with the angle at which the energy beam was transmitted into the space 70 and the distance between the transmitter 30 and the detector 40.

Figure 8:
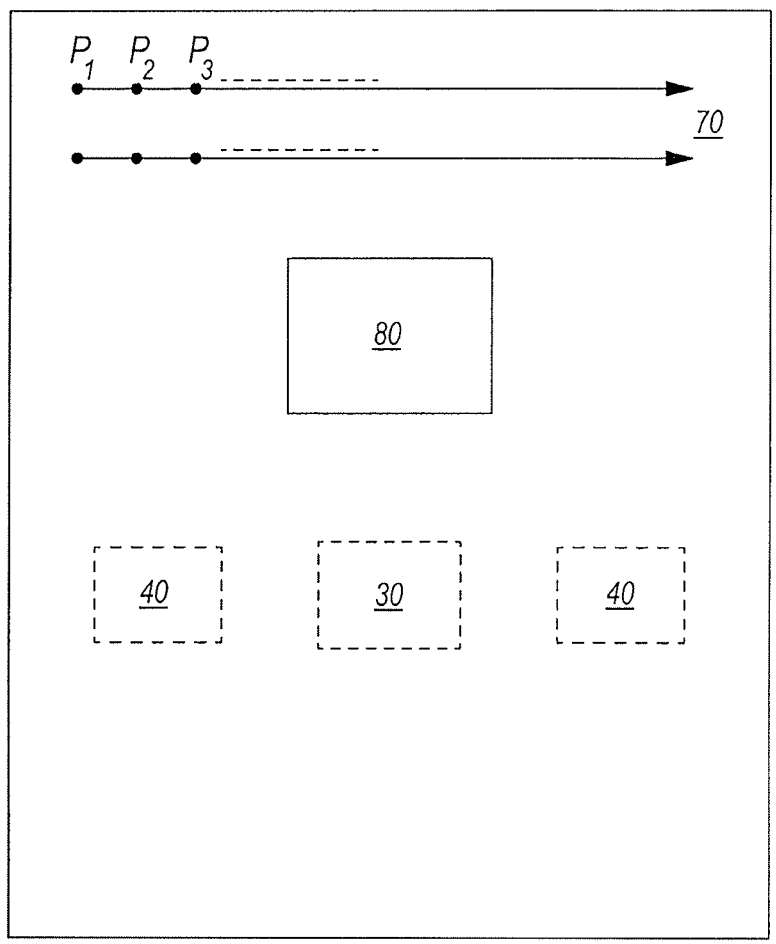
FIG. 8 is a top view of a space and a scanning pattern for the space for a scanning security system.

By repeating the above procedure for a plurality of points throughout the space 70, a complete three-dimensional map is generated. In one construction, the scanning assembly 34 moves the energy source 32 in a raster-scanning motion, i.e., a series of parallel lines are scanned, moving across the room or other space 70 to determine positions of points $P_1$, $P_2$, $P_3$, etc. (FIG. 8). In other constructions, a particular subregion of interest may be scanned repeatedly, e.g., due to movement of objects within the particular area. In one particular construction, the entire space 70 is scanned repeatedly The space 70 may be completely scanned at a lower temporal or spatial resolution until a significant difference is noted between two subsequent scans, indicating a possible security threat. Subsequent scanning can then be performed at higher spatial and/or temporal resolutions, either throughout the entire space 70 or only within the particular region where the difference was observed.

In various constructions, the space 70 is completely scanned at time intervals of about once in 250 milliseconds, about once per second, about once per minute, about once every five minutes, about once every ten minutes, or about once per hour. Shorter or longer time intervals are also possible. The number of points and lines per scan will also be varied based on factors including the size of the space 70 or a subregion thereof to be scanned; the response time of the equipment that is used; and the time required to obtain a sufficiently clear signal. In some constructions, the system 20 begins a subsequent scan as soon as the previous scan is complete. In other constructions, the system 20 waits for a delay interval before beginning the next scan. In still other constructions, the system 20 begins each scan when a predetermined amount of time has elapsed, e.g., a new scan is started every 30 seconds.

In one construction, the scanned points are collected at spatial intervals determined by uniform changes in the angle of the energy source 32. When the energy source 32 scans regions of the space 70 that are distant from the transmitter 30, moving the energy source in uniform increments leads to a non-uniform probing of the space 70. In another construction, the energy source 32 is moved at non-uniform angle increments that produce a substantially uniform linear spacing between subsequent points. In still other constructions, various other uniform or non-uniform scanning procedures may be used to scan the space 70. In various constructions, the spacing between scanned points ranges from about a millimeter to about a meter, although larger, smaller, or intermediate spacings are also possible.

In practice, the security system 20 should be capable of distinguishing actual security threats from so-called 'false positives,' i.e., objects 80 that move within the space 70 but which are not intruders. False positives may include pets (e.g., cats or dogs) as well as balloons, plants, or artwork (e.g., mobiles) that may move due to movement of air in the space 70. In outdoor use, the system 20 should distinguish movement of small animals (e.g., raccoons, squirrels) from actual security threats that are posed by humans or other large objects.

Therefore, the system 20 performs subsequent analysis of the scan data. Using data collected from each scan, the system 20 produces a three-dimensional map of reflective features in the space 70. Analysis is then performed on two or more of the maps to determine if there are security threats in the space 70. In one construction, an initial 'baseline' three-dimensional image is collected at a given time, e.g., when the system 20 is initially armed. All subsequent images are then compared relative to this baseline image. In another construction, a comparison is performed between images collected at subsequent time points, to determine changes that occur from one time point to the next.

The comparison may comprise a map showing point-by-point differences between the two compared images (i.e., a difference map is generated). Any substantial change from either the baseline map or from the map of the previous time point would be further investigated as a possible security threat. Maps of differences between the pairs of images may be further analyzed to extract individual features, e.g., based on aspects such as the size, shape, or height of the object.

Alternatively, the system 20 may analyze each three-dimensional map to extract features and identify individual objects 80 within the space 70 (e.g., based on criteria such as the morphology of the object 80 and/or whether it is moving) and subsequently track the locations of the identified objects 80 over time. Thus, the information gained from extraction and tracking of features is used to distinguish false positives from actual threats, and any object 80 that meets predetermined criteria for a false positive are ignored.

For example, items such as balloons or plants might move slowly within the same approximate area (e.g., due to air flow within the space 70) and thus over time the movement of the objects 80 would be restricted to within the same limited area. Similarly, the tracking of objects also allows analysis of potential threats based on the rate of movement of the objects. False positives such as plants or balloons can be distinguished from actual threats (e.g., a human walking through the space 70) based on differences in the rates of movement of the different types of objects. In addition, the analysis of potential threats can combine predictive information from several different types of analyses to more effectively identify actual security threats.

Other types of false positive objects that might be encountered in a residential setting include pets. Among the possible strategies to exclude pets as actual security threats is to determine the height of any object that is moving, relative to the surface on which the object is moving. For example, if the moving object is on the floor of the space 70, the height of the object is determined relative to the floor. Alternatively, if the moving object is on another surface (e.g. a table or sofa) the height of the object is determined relative to the other surface. Thus, even if the pet climbs onto another object, it will still be properly recognized as a false positive, i.e., not an actual security threat.

Another type of security threat that the system 20 may identify is an attempt to block operation of the system 20. Specifically, an intruder might cover the transmitter 30 or one or both of the detectors 40. If the system 20 fails to receive any reflected energy from a complete scan of the space 70 on one or both detectors 40, or if the readings from one or both detectors 40 indicate the presence of an object that is very close to the transmitter 30 and/or detectors 40 (e.g., according to a predetermined criteria such as less than 0.5 meters), then the system 20 determines that a potential threat has been identified and initiates an alarm, as discussed below.

When an actual security threat has been identified, the system 20 activates and alarm and/or notifies a remote location of the threat. The alarm may include activation of lights (e.g., floodlights, flashing lights, etc.), sounds (e.g., mechanical or electronic bells or sirens), or other devices (e.g., doors may automatically close and/or lock). Additionally, the system 20 may notify a remote location of the security threat, including a police station, private security firm, or an individual (e.g. through a pager, cell phone, or other portable electronic device, an automatically-generated email, or other electronic means).

Various features and embodiments of the invention are set forth in the following claims.

What is claimed is:

1. A method of distinguishing false positives from threats in a space, the method comprising:
  (a) collecting a first scan of the space during a first time interval, comprising
    (i) illuminating at least a portion of the space with an energy from an energy source such that the energy is reflected from a surface in the space;
    (ii) detecting the incident angle of the reflected energy with a plurality of detectors, each disposed at a known distance from the energy source;
    (iii) calculating a distance from the surface to the energy source using triangulation and the incident angle detected by each of the plurality of detectors and distances between the plurality of detectors;
    (iv) repeating steps (i)-(iii) for a plurality of portions of the space;
    (v) generating a first three-dimensional map of the space for the first time interval;
  (b) collecting a second scan of the space during a second time interval, comprising repeating steps (a)(i)-(a)(v) above during the second time interval to generate a second three-dimensional map of the space;
  (c) comparing the first three-dimensional map to the second three-dimensional map to determine a change in the space;
  (d) identifying a potential security threat based on the change in the space; and
  (e) determining, based on the change in the space, if the potential security threat is a false positive based on a rate of movement, a height, and a location of the threat within the space.

2. The method of claim 1, wherein illuminating at least a portion of the space with energy from an energy source includes illuminating with a light source.

3. The method of claim 2, wherein illuminating with a light source includes illuminating with a laser.

4. The method of claim 3, wherein illuminating with a laser includes emitting a beam having a modulated signature.

5. The method of claim 1, wherein illuminating at least a portion of the space includes illuminating a room.

6. The method of claim 5, wherein illuminating a room include illuminating with a laser.

7. The method of claim 6, further comprising attaching each of the plurality of detectors and the laser to a ceiling of the room such that the laser is between the plurality of detectors.

8. A scanning security system, comprising:
  a transmitter comprising an energy source and a scanning assembly;
  a plurality of detectors, each configured to detect a direction of energy impinging thereon;
  a computing system including a processor and a storage medium, the computing system configured to
  (a) cause a first scan of a space during a first time interval, wherein the first scan includes
    (i) illuminating at least a portion of the space with energy from the energy source at an illumination angle, such that the energy is reflected from a surface in the space;

(ii) detecting an incident angle of the reflected energy with each detector disposed at a known distance from the energy source;

(iii) calculating a distance from the surface to the energy source using triangulation based on the incident angle detected by each of the plurality of detectors and distances between the plurality of detectors;

(iv) repeating steps (i)-(iii) for a plurality of different locations in the space;

(v) generating a first three-dimensional map of the space for the first time interval;

(b) cause a second scan of the space at a second time interval, wherein the second scan includes repeating steps (a)(i)-(a)(v) above during the second time interval to generate a second three-dimensional map of the space;

(c) compare the first three-dimensional map to the second three-dimensional map to determine a change in the space; and (d) determine if a potential security threat is present based on the change in the space, and (e) determine, based on the change in the space, if the potential security threat is a false positive based on a rate of movement, a height, and a location of the threat within the space.

9. The scanning security system of claim 8, wherein the energy source comprises a laser.

10. The scanning security system of claim 9, wherein the detector comprises a hemispherical element having a plurality of tubes attached thereto, wherein each tube has an energy detection element disposed therein.

11. The scanning security system of claim 9, wherein the detector comprises an optical element focused on an array of detection elements.

* * * * *